US010401845B2

United States Patent
Grant, Jr. et al.

(10) Patent No.: US 10,401,845 B2
(45) Date of Patent: Sep. 3, 2019

(54) MANUFACTURING SYSTEM HAVING SUB-DIMENSIONAL PROCESSING MODULES

(71) Applicant: Caterpillar Inc., Peoria, IL (US)

(72) Inventors: Marion Billingsley Grant, Jr., Princeville, IL (US); Michael Patrick Vogler, Peoria, IL (US); Thomas Michael Garland, East Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 607 days.

(21) Appl. No.: 14/988,381

(22) Filed: Jan. 5, 2016

(65) Prior Publication Data

US 2017/0192415 A1 Jul. 6, 2017

(51) Int. Cl.
*G05B 19/418* (2006.01)

(52) U.S. Cl.
CPC ........... *G05B 19/41895* (2013.01); *G05B 2219/50393* (2013.01); *Y02P 90/02* (2015.11)

(58) Field of Classification Search
CPC .... G05B 19/41895; G05B 2219/50393; Y02P 90/02; B25J 9/1674; B25J 9/1682; B60Q 2400/50; G03B 21/2093
See application file for complete search history.

(56) References Cited

U.S. PATENT DOCUMENTS

| | | | |
|---|---|---|---|
| 6,344,629 B1 * | 2/2002 | Kato | B62D 65/02 218/147 |
| 6,463,360 B1 * | 10/2002 | Terada | B25J 9/1679 318/568.12 |
| 6,509,576 B2 | 1/2003 | Woo-Dong | |
| 7,404,786 B2 | 7/2008 | Krosta et al. | |
| 7,459,656 B2 | 12/2008 | Yamaoka et al. | |
| 8,157,155 B2 | 4/2012 | Diez et al. | |
| 8,800,745 B2 | 8/2014 | Spangler | |
| 9,020,650 B2 * | 4/2015 | Lutze | F03D 7/0284 700/287 |

(Continued)

FOREIGN PATENT DOCUMENTS

| | | |
|---|---|---|
| JP | 10211573 | 8/1998 |
| JP | 2007-090447 | 4/2007 |

(Continued)

OTHER PUBLICATIONS

Anderson, Paul and Ziegert, John, entitled "Sub-Scale Machining of Large Components", Procedia Manufacturing, vol. XXX (2015), pp. 1-11.

*Primary Examiner* — Abdelmoniem I Elamin
(74) *Attorney, Agent, or Firm* — Finnegan, Henderson, Farabow, Garrett & Dunner, LLP

(57) ABSTRACT

A system is provided for manufacturing a component within a factory. The system may have an autonomous vehicle configured to transport the component to an area within an open space of the factory and to secure the component at the area during processing of a designated volume of the component. The system may also have a plurality of processing modules each configured to process a portion of the component less than a whole of the designated volume, and a controller in communication with the autonomous vehicle and the plurality of processing modules. The controller may be configured to coordinate operations of the plurality of processing modules according to a programmed process plan.

19 Claims, 2 Drawing Sheets

(56) References Cited

U.S. PATENT DOCUMENTS

| | | | |
|---|---|---|---|
| 9,102,060 B2* | 8/2015 | Tarragona | B25J 9/1656 |
| 9,568,917 B2* | 2/2017 | Jones | G06Q 10/08 |
| 9,623,553 B1* | 4/2017 | Theobald | B25J 9/00 |
| 2001/0004718 A1* | 6/2001 | Gilliland | B25J 9/1671 |
| | | | 700/255 |
| 2004/0055131 A1 | 3/2004 | Ghuman et al. | |
| 2004/0133298 A1* | 7/2004 | Toyserkani | B23K 26/032 |
| | | | 700/166 |
| 2014/0363264 A1* | 12/2014 | Gowa | B25J 5/007 |
| | | | 414/539 |
| 2015/0042485 A1* | 2/2015 | Suessemilch | G03B 21/2093 |
| | | | 340/815.4 |
| 2015/0190926 A1 | 7/2015 | Miegel et al. | |
| 2016/0101940 A1* | 4/2016 | Grinnell | G05D 1/0297 |
| | | | 700/216 |
| 2016/0187886 A1* | 6/2016 | Jones | G06Q 10/08 |
| | | | 701/26 |
| 2017/0182759 A1* | 6/2017 | Crothers | B32B 37/12 |
| 2017/0190117 A1* | 7/2017 | Dow | G05B 19/4099 |
| 2017/0190119 A1* | 7/2017 | Dow | G05B 19/4099 |

FOREIGN PATENT DOCUMENTS

| | | |
|---|---|---|
| JP | 2011-110611 | 6/2011 |
| JP | 2013-202673 | 10/2013 |
| WO | WO 2005-108019 | 11/2005 |

* cited by examiner

MANUFACTURING SYSTEM HAVING SUB-DIMENSIONAL PROCESSING MODULES

TECHNICAL FIELD

The present disclosure is directed to a manufacturing system, and more particularly, to a modular manufacturing system having sub-dimensional processing modules.

BACKGROUND

Traditional approaches to manufacturing large components (e.g., truck frames, engine blocks, final drive gears, axles, etc.) have included the use of fully contained cells. In particular, the large component (and/or pieces used to form the large component) is brought into an established fabrication cell (e.g., a welding cell, a grinding cell, a drilling cell, a lathing or milling cell, a polishing cell, etc.) and mounted into specialized fixtures. Dedicated processing equipment (e.g., welders, grinders, drills, mills, lathes, polishers, measurement devices, etc.) that are mounted to and powered by the cell are then used to create particular features of the component. After the particular features are created, the component is moved to another fabrication cell where additional features are created, and a new component is loaded into the original cell. Although the traditional approach may be acceptable in some instances, it can also have a high capital cost and consume a large amount of space within a factory setting.

An alternative manufacturing approach is disclosed in U.S. Patent Publication No. 2015/0190926 of Miegel et al. that published on Jul. 9, 2015 ("the '926 publication"). In particular, the '926 publication discloses a system having a computer and multiple interacting robots. The robots form part of a production cell, in which both handling and processing types of robots work together as a production unit based on instructions received from the computer.

Although the cooperative use of multiple robots under the regulation of the computer may be more versatile and/or efficient than a traditional manufacturing cell, the system of the '926 publication may still be less than optimal. In particular, the robots may still be tied to a single cell, dedicated to a particular process, and configured for use with a particular component. This may limit the use of the system and, thereby, also a value or efficiency of the system.

The disclosed manufacturing system is directed to overcoming one or more of the problems set forth above.

SUMMARY

In one aspect, the present disclosure is directed toward a system for manufacturing a component within a factory. The system may include an autonomous vehicle configured to transport the component to an area within an open space of the factory and to secure the component at the area during processing of a designated volume of the component. The system may also have a plurality of processing modules each configured to process a portion of the component less than a whole of the designated volume, and a controller in communication with the autonomous vehicle and the plurality of processing modules. The controller may be configured to coordinate operations of the plurality of processing modules according to a programmed process plan.

In a further aspect, the present disclosure is directed toward another system for manufacturing a component. This system may include a plurality of positionable processing modules, and a controller in communication with each of the plurality of positionable modules. The controller may be configured to cause at least two of the plurality of positionable modules to concurrently engage the component based on at least one of a position of another of the plurality of positionable modules, a dimension of the component, a location of the component, or an orientation of the component, and a programmed process plan.

In yet another aspect, the present disclosure is directed toward a method of manufacturing a component within a factory. The method may include autonomously transporting the component to an area within an open space of the factory, and autonomously securing the component at the area during processing of a designated volume of the component. The method may also include autonomously coordinating processing of the designated volume of the component by a plurality of processing modules according to a programmed process plan.

DETAILED DESCRIPTION

Figure 1:
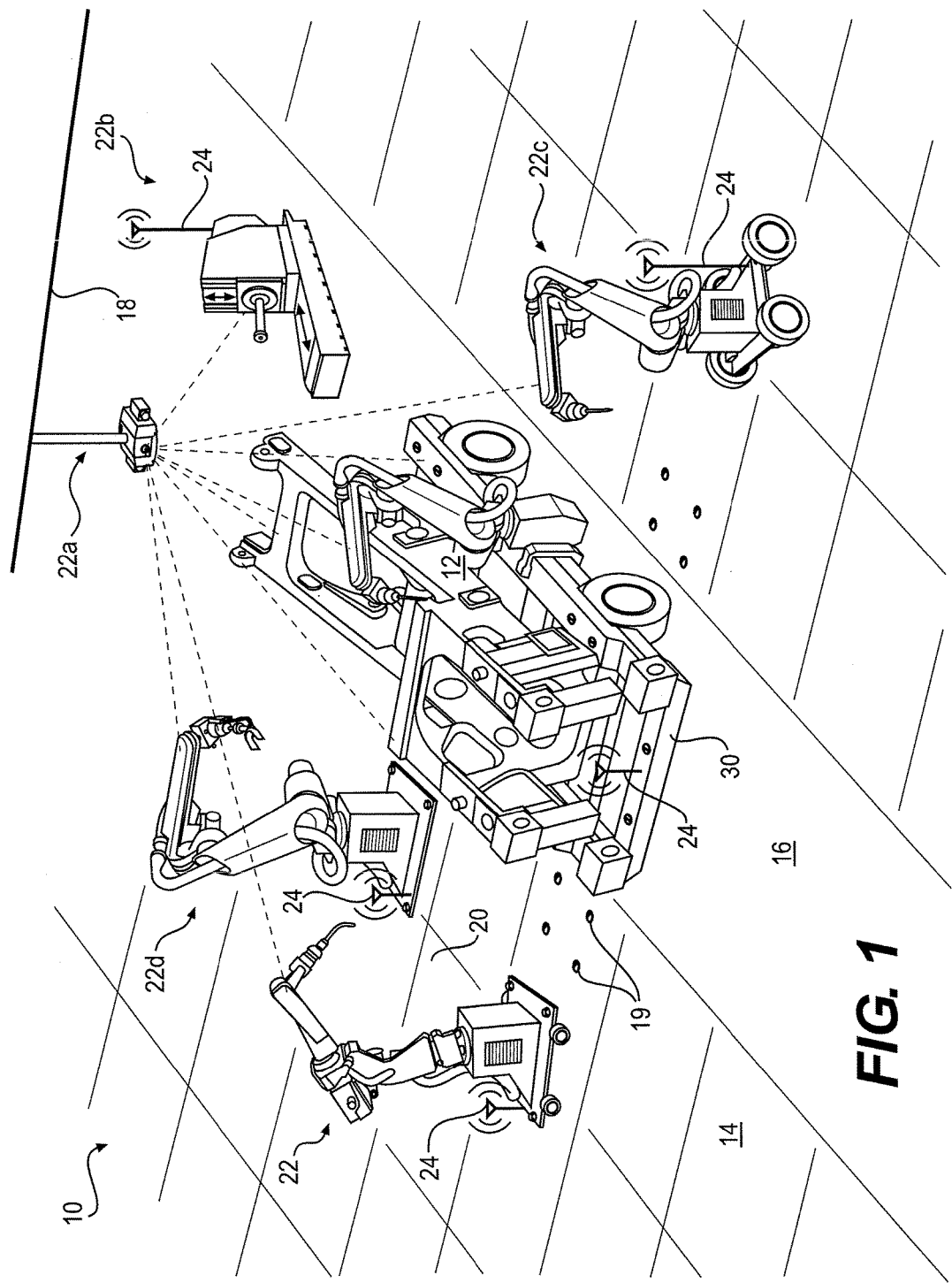
FIG. 1 is an isometric illustration of an exemplary disclosed manufacturing system.
Figure 2:
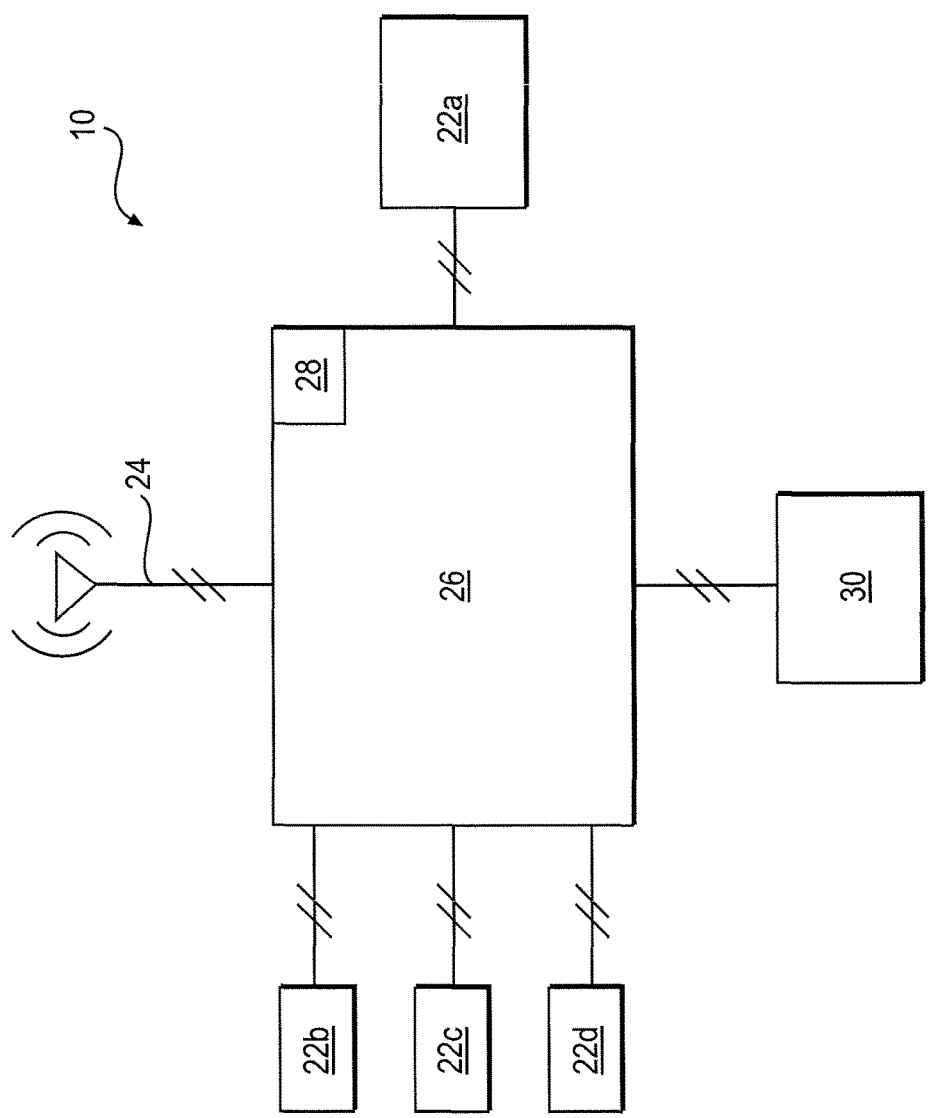
FIG. 2 is a diagrammatic representation of the system of FIG. 1.

FIGS. 1 and 2 illustrate an exemplary system 10 used to perform a manufacturing process on a component 12 within the setting of a factory 14. The process may include one or more of a measuring process, an additive process (e.g., welding), a removal process (e.g., cutting, grinding, drilling, etching, etc.), and a finishing process (e.g., polishing, painting, hardening, etc.).

Factory 14 may generally include at least a floor 16. In some embodiments, factory 14 may additionally include a ceiling 18 and one or more walls (not shown). Factory 14 may have a generally open space (i.e., a space without dedicated processing locations) on floor 16, with infrastructure that can support various processes at any location within the space. The infrastructure may include, for example, mounting fixtures 19 (e.g., grooves, pegs, holes, latches, threaded bores, studs, tie-downs, etc.) that can be used to secure component 12 and/or to secure temporary processing equipment. The infrastructure may additionally include a power supply, a fluid (e.g., coolant, air, fuel, lubrication, etc.) supply, drainage, ventilation, debris collection, filtration, data transfer, and other infrastructure known in the art. In the disclosed example, floor 16 and/or ceiling 18 are equipped with a distributed power grid 20 that is recessed within the corresponding structure and configured to interact with the temporary processing equipment. For example, some or all of the equipment may include an electrode that is shaped and sized to engage power grid 20 at any suitable location. In this example, the electrode may slide inside a channel of power grid 20 as the corresponding equipment moves about floor 16. In another example, some or all of the equipment includes a tether that is configured to extend to particular locations of power grid 20 (e.g., to established receptacles).

The temporary equipment utilized within factory 14 to manufacture component 12 may include, among other things, a plurality of mobile and self-guided processing modules 22. Processing modules 22 may be considered temporary only because of the ability of modules 22 to move to different locations within the open floor space of factory 14. That is, processing modules 22 may not be restricted to a particular location (e.g., fixed to a particular cell) at factory 14, but may be moved to any location on floor 16, as needed, to perform the same or different processing operations on the same or different components 12. Processing modules 22 may include, for example, a metrology module 22a (e.g., a laser tracking unit that measures a size, location, and/or material condition of component 12), a cutting or removal module 22b (e.g., a grinding module, a drilling module, a lapping module, etc.), an additive module 22c (e.g., a welding module), a grasping module 22d, a finishing module (not shown), or another module known in the art.

Additional processing modules (not shown) may also be used to facilitate the operation of processing modules 22. These modules may include, among others, housekeeping modules and/or indirect supply modules. Housekeeping modules may be modules that maintain (e.g., adjust, tune, lubricate, repair, reconfigure, clean, etc.) modules 22. For example, a housingkeeping module may be able to change out worn cutting tools held by cutting module 22b, or replace one type of welding tool being held by welding module 22c with another type of welding tool. An indirect supply module may be configured to resupply modules 22 with consumables such as welding rods, gas, flux, nuts, bolts, etc.

Any number and type of processing modules 22 may be used together in a coordinated manner to manufacture component 12. For example, it may be possible for one processing module 22 to complete an assigned task; for two processing modules 22 to complete the same task together; or for five processing modules 22 to complete the same task even faster. Likewise the same task could be completed by multiple different types of processing modules 22. The number and type of processing modules 22 assigned to cooperatively complete a particular task may depend on an availability of processing modules 22, a proximity of processing modules 22 to component 12, and specific requirements of component 12.

In some applications, processing modules 22 may be considered sub-dimensional modules. In particular, it may be possible for component 12 to have a volume designated for processing that is larger than a tool of any one processing module 22. For example, component 12 may have a large area that needs to be removed (e.g., milled, ground, cut, etc.), and this area may be larger than the corresponding cutting blade of any one processing module 22. In contrast to the traditional approach of having a processing tool larger than the designated volume, multiple separate processing modules 22 with smaller tools could be used to simultaneously and cooperatively process the designated volume. In this embodiment, each processing module 22 may be configured to process about 30% or less of the designated volume. It may also be possible for multiple processing modules 22 to concurrently perform different manufacturing processes on the same or different areas of component 12, if desired. For example, one processing module 22 may be cutting along one edge of component 12, while another processing module is welding an adjacent surface.

All processing modules 22 may be movable in some manner. For example, some processing modules 22 may have a mobile undercarriage (e.g., tracks, wheels, or hovel fans), such that they can move autonomously or be easily moved (e.g., pushed or pulled) by a technician or other machine between desired locations on floor 16. When a mobile processing module 22 is at a location suitable for performing an assigned task, the processing module 22 may be parked and/or secured. For example, the mobile processing module 22 may be connected to floor 16, ceiling 18, and/or one of the walls by way of mounting fixtures 19. In another example, some processing modules 22 may include a fixed base that is selectively transported (e.g., carried manually or by another machine) to a desired location and then secured at that location. It is contemplated that, in addition to or as an alternative to being secured to floor 16, some or all of processing modules 22 may be mounted to another processing module 22, mounted directly to component 12, and/or mounted to a fixture or structure that is also holding component 12.

Regardless of the ability of processing modules 22 to move about floor 16, some or all of processing modules 22 may also be positionable. That is, a part of processing module 22 may be movable relative to the fixed or mobile base. For example, some or all of processing modules 22 may include robotic arms, movable heads, translatable tools, stacking magazines, etc. that allow some movement relative to the associated base. In a particular example, some or all of processing modules 22 have actuators allowing 6-degree location & angular orientation $(X,Y,Z,\theta,\emptyset,\alpha)$. In this way, regardless of the exact base position and/or orientation of processing modules 22 relative to component 12, some tool location adjustment and/or processing movements may still be possible.

Processing modules 22 may be electrically powered and/or capable of communication. As described above, processing modules 22 may connect with the infrastructure of floor 16 and/or ceiling 18 (e.g., via the electrodes and/or tethers) to receive power therefrom. It may also be possible to communicate data via the electrode and/or tethered connections. Additionally or alternatively, some of all of processing modules 22 may be equipped with communication hardware 24 (e.g., antennae, Bluetooth, etc.) that allows them to communicate with each other and/or other entities wirelessly.

Processing modules 22 may be smart modules. That is, processing modules 22 may each be provided with a local controller (not shown), which is programmed to execute instructions to complete an assigned task. The controller may be configured to control tool movements, monitor in-process conditions, track component and/or tool positioning, establish communications, provide feedback, etc. In some embodiments, the local controllers of each processing module 22 may communicate with a centralized controller 26 (shown only in FIG. 2) via hardware 24 to help coordinate inter-module activities.

Controller 26 may include a memory 28 having stored therein a plan for processing the features of component 12. The plan may include, among other things, an identification of component 12, a current condition (e.g., size, shape, volume, etc.) of component 12, a desired final condition, and/or a sequence of one or more processes that must be performed on component 12. Based on the processing plan, controller 26 may be configured to control placement and use of each of the other processing modules 22. For example, controller 26 may determine the type and number of processing modules 22 needed to manufacture the features of component 12; dispatch the appropriate modules 22 to desired locations around, in, or on component 12; and assign tasks to each module 22.

In addition, controller 26 may be configured to monitor the relative locations, operations, and performances of modules 22 (e.g., via metrology module 22a). For example, based on input from metrology module 22a, controller 26 may know where component 12 is located in 3-dimensional space and know its orientation. In addition, controller 26 may know (based on information from metrology module 22a) where each of modules 22 is located and oriented relative to component 12. Further, each module 22 may be able to track the location of their own respective tools (e.g., cutting tools, welding tools, grasping tools, etc.), and transmit this information to controller 26 wirelessly. In some embodiments, an additional metrology module (e.g., a stationary facility module—not shown) may additionally be utilized in conjunction with system 10 to facilitate coordinated activities at one or multiple different locations within factory 14. Thus, controller 26 may know and be able to precisely control movements and operations of each of the tools (e.g., based on the metrology information and the relative tool information). Controller 26 may be located locally (i.e., in factory 14 where component 12 is being manufactured) or remotely (e.g., at a back office), as desired. In addition, controller 26 may be dedicated for use in fabricating only one component 12 at a time, one type of component 12 (e.g., only truck frames), any component 12 at a particular location in factory 14, or all components at any location within factory 14.

In some embodiments, component 12 may itself be mobilized and caused to move about factory 14 by controller 26. For example, component 12 could be locked to an autonomous vehicle ("vehicle") 30 that is being directed and/or steered by controller 26. Vehicle 30 may be self-powered (e.g., via a battery or an engine), and include communication hardware 24. With this configuration, controller 26 may command vehicle 30 to the open space of floor 16, and cause vehicle 30 to be parked and/or locked to floor 16 (e.g., via fixtures 19), thereby anchoring component 12 to floor 16 at a desired location via vehicle 30. In some embodiments, vehicle 30 may additionally include a frame equipped with an actuator (e.g., a cylinder or motor) that is configured to translate, rotate, and/or tilt component 12 after vehicle 30 is locked to floor 16. In this manner, the position of component 12 may be finely tuned and/or adjusted during processing, as required.

INDUSTRIAL APPLICABILITY

The disclosed manufacturing system may provide portability and flexibility to a manufacturing process at a low cost. In particular, by utilizing individual mobile processing modules that are sub-dimensional and operationally flexible, any number and type of components can be manufactured anywhere within the open space of a factory without incurring high initial capital costs. In additional, iterative design changes made to the component can be easily accommodated using the processing modules, and the processing modules may be assigned to different locations to create different features at different times on different components as demand dictates. A brief overview of the operation of system 10 will now be described with reference to FIGS. 1 and 2.

At the start of a manufacturing process, component 12 (or parts of component 12) may be loaded onto vehicle 30 and locked into place. Thereafter, controller 26 may be notified that vehicle 30 is ready for tasking. Controller 26 may consider spaces on floor 16 that are open, and compare parameters of the open spaces to requirements of vehicle 30 and component 12 (e.g., size requirements, power requirements, module requirements, etc.). Controller 26 may then assign a particular space to vehicle 30, and mark that space within memory as occupied.

In the disclosed embodiment, vehicle 30 autonomously moves to its assigned space and locks itself to floor 16 (e.g., via fixtures 19) in preparation for processing. In other embodiments, however, vehicle 30 may be manually moved to its assigned space and/or manually locked to floor 16. At some point during or after the movement of vehicle 30 to its assigned location, controller 26 may also dispatch to the same location one more processing modules 22 required to manufacture component 12. These modules may include, for example, metrology module 22a and one or more of cutting module 22b, welding module 22c, grasping module 22d, or another module. In addition, depending on the support requirements of these modules, controller 26 may also dispatch a housekeeping module and/or an indirect supply module to the same location. It should be noted that, in addition to dispatching particular modules to the general location of vehicle 30, controller 26 may also provide a specific location and/or orientation of each module relative to vehicle 30 and/or component 12. In some embodiments, it may be necessary for controller 26 to also request manual installation and/or setup help from a human technician. For example, particular processing modules 22 may need to be bolted in place, hung from ceiling 18, and or oriented in a particular way relative to component 12.

Once processing modules 22 are in place relative to component 12, processing modules may be connected to power grid 20 and activated. Thereafter processing modules 22 may establish communication with each other and/or with controller 26, and receive their assigned tasks. In some instances, each processing module 22 may receive different tasks. In other instances, however, processing modules 22 may be assigned to complete a task together. For example, one processing module 22 may be assigned to grasp component 12, while another processing module may be assigned to bore a hole through component 12 at the location being grasped. In another example, two or more processing modules 22 may each be tasked with grinding a subset of a large common area of component 12.

Throughout setup, during processing of component 12, and/or after processing, metrology module 22a may provide feedback to controller 26. For example, metrology module 22a may capture a location, orientation, size, shape, finish, etc. of component 12, vehicle 30, and or other processing module 22. This information may be wirelessly communicated to controller 26 and controller 26 may compare the information to expected parameters. When a significant deviation between the information and expected parameters exist, controller 26 may command adjustments to be made by process modules 22.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A system for manufacturing a component within a factory, the system comprising:
   an autonomous vehicle configured to transport the component to an area within an open space of the factory and to secure the component at the area during processing of a designated volume of the component, wherein the autonomous vehicle includes a frame and at least one actuator configured to adjust a position of the component relative to the frame;
   a plurality of processing modules each configured to process a portion of the component less than a whole of the designated volume, wherein at least one of the plurality of processing modules is mobile and self-guided; and a controller in communication with the autonomous vehicle and the plurality of processing modules, wherein the controller is configured to coordinate operations of the plurality of processing modules according to a programmed process plan, and wherein the controller is configured to control the actuator of the autonomous vehicle to adjust the position of the component relative to the plurality of processing modules during processing of the component.

2. The system of claim 1, wherein the controller is further configured to monitor an in-process condition of the component during operation of the plurality of processing modules.

3. The system of claim 1, wherein the autonomous vehicle is configured to anchor the component to a floor of the factory.

4. The system of claim 3, wherein the autonomous vehicle is configured to lock the component to the autonomous vehicle and to lock the autonomous vehicle to the floor.

5. The system of claim 1, wherein the portion processed by each of the plurality of processing modules is about 30% or less of the designated volume to be processed.

6. The system of claim 1, wherein the plurality of processing modules includes two or more of a removal module, an additive module, a finishing module, and a measuring module.

7. The system of claim 6, wherein the measuring module includes a laser tracking metrology module configured to determine a location and orientation of each of the plurality of processing modules relative to the component and to continuously transmit the location and orientation to the controller.

8. The system of claim 1, wherein the controller is configured to coordinate concurrent operations of the plurality of processing modules.

9. The system of claim 1, wherein the controller is configured to communicate wirelessly with at least one of the plurality of processing modules.

10. The system of claim 1, wherein each of the plurality of processing modules is connectable to at least one of the autonomous vehicle, the component, and infrastructure of the factory.

11. The system of claim 10, wherein each of the plurality of processing modules is further configured to receive power from at least one of a floor and a ceiling of the factory.

12. The system of claim 11, wherein at least one of the plurality of processing modules is tethered to the ceiling.

13. The system of claim 11, further including a power grid recessed within at least one of the floor and the ceiling, wherein at least one of the plurality of processing modules includes an electrode receivable within the power grid.

14. A method of manufacturing a component within a factory, comprising:
autonomously transporting the component to an area within an open space of the factory by an autonomous vehicle that includes a frame and at least one actuator configured to adjust a position of the component relative to the frame;

autonomously securing the component at the area during processing of a designated volume of the component; and autonomously coordinating processing of the designated volume of the component by a plurality of processing modules according to a programmed process plan, wherein at least one of the plurality of processing modules is mobile and self-guided;

autonomously determining a location and orientation of each of the processing modules relative to the component by a measuring module that includes a laser tracking metrology module; and autonomously adjusting the at least one actuator of the autonomous vehicle to adjust a position of the component relative to the frame of an autonomous vehicle and relative to the plurality of processing modules during the processing of the component.

15. The method of claim 14, wherein autonomously coordinating processing includes coordinating concurrent operations of the plurality of processing modules.

16. A system for manufacturing a component within a factory, the system comprising:
an autonomous vehicle configured to transport the component to an area within an open space of the factory and to secure the component at the area during processing of a designated volume of the component;

a plurality of processing modules each configured to process a portion of the component less than a whole of the designated volume, wherein at least one of the plurality of processing modules is mobile and self-guided;

a controller in communication with the autonomous vehicle and the plurality of processing modules, wherein the controller is configured to coordinate operations of the plurality of processing modules according to a programmed process plan; and a measuring module comprising a laser tracking metrology module that is configured to determine a location and orientation of each of the plurality of processing modules relative to the component and to continuously transmit the location and orientation to the controller.

17. The system of claim 16, wherein the controller is further configured to monitor an in-process condition of the component during operation of the plurality of processing modules.

18. The system of claim 16, wherein the controller is configured to cause at least two of the plurality of processing modules to concurrently engage the component based on at least one of a position of another of the plurality of processing modules, a dimension of the component, a location of the component, or an orientation of the component.

19. The system of claim 16, wherein the portion processed by each of the plurality of processing modules is about 30% or less of the designated volume to be processed.

* * * * *